(12) United States Patent
Voss

(10) Patent No.: US 10,110,796 B2
(45) Date of Patent: Oct. 23, 2018

(54) CAMERA GRIP

(71) Applicant: Arnold & Richter Cine Technik GmbH & Co. Betriebs KG, Munich (DE)

(72) Inventor: Hendrik Voss, Munich (DE)

(73) Assignee: Arnold & Richter Cine Technik GmbH & Co. Betriebs KG, Munich (DE)

( * ) Notice: Subject to any disclaimer, the term of this patent is extended or adjusted under 35 U.S.C. 154(b) by 0 days.

(21) Appl. No.: 15/483,263

(22) Filed: Apr. 10, 2017

(65) Prior Publication Data

US 2017/0302842 A1 Oct. 19, 2017

(30) Foreign Application Priority Data

Apr. 15, 2016 (DE) .......................... 10 2016 106 997

(51) Int. Cl.
*H04N 5/232* (2006.01)
*F16M 13/04* (2006.01)
*G03B 17/56* (2006.01)

(52) U.S. Cl.
CPC ........ *H04N 5/23203* (2013.01); *F16M 13/04* (2013.01); *G03B 17/563* (2013.01); *H04N 5/23216* (2013.01); *H04N 5/23293* (2013.01)

(58) Field of Classification Search
CPC ............................. F16M 13/04; G03B 17/563
See application file for complete search history.

(56) References Cited

U.S. PATENT DOCUMENTS 3,913,116 A  10/1975 Kastner et al.
6,724,429 B2 *  4/2004 Shore .................... G03B 13/20
                                                        348/373
(Continued)

FOREIGN PATENT DOCUMENTS

DE       202012008339 U1   9/2012
DE       202009018991 U1   4/2015
(Continued)

OTHER PUBLICATIONS

Aputure V-Grip VG-1, User Manual for a USB Focus Handle, Feb. 8, 2014.

(Continued)

*Primary Examiner* — Ahmed A Berhan
(74) *Attorney, Agent, or Firm* — Dinsmore & Shohl LLP

(57) ABSTRACT

A hand grip for a motion picture camera comprises a grip section; a connection section for connecting the grip section to the motion picture camera or to a camera carrier; at least one actuation device for inputting a control command; an electronic memory for storing configuration data that represent an association between input control commands and different control signals; a control device for generating a control signal in response to the input control command and in dependence on the stored configuration data; a signal output for outputting the generated control signal to the motion picture camera or to an associated focus drive; and an electronic display device for presenting a configuration menu that represents different configuration options, wherein the control device is adapted to change the stored configuration data in dependence on the configuration menu shown and in response to a configuration command of a user.

21 Claims, 2 Drawing Sheets

(56) References Cited

U.S. PATENT DOCUMENTS

Figure 1:
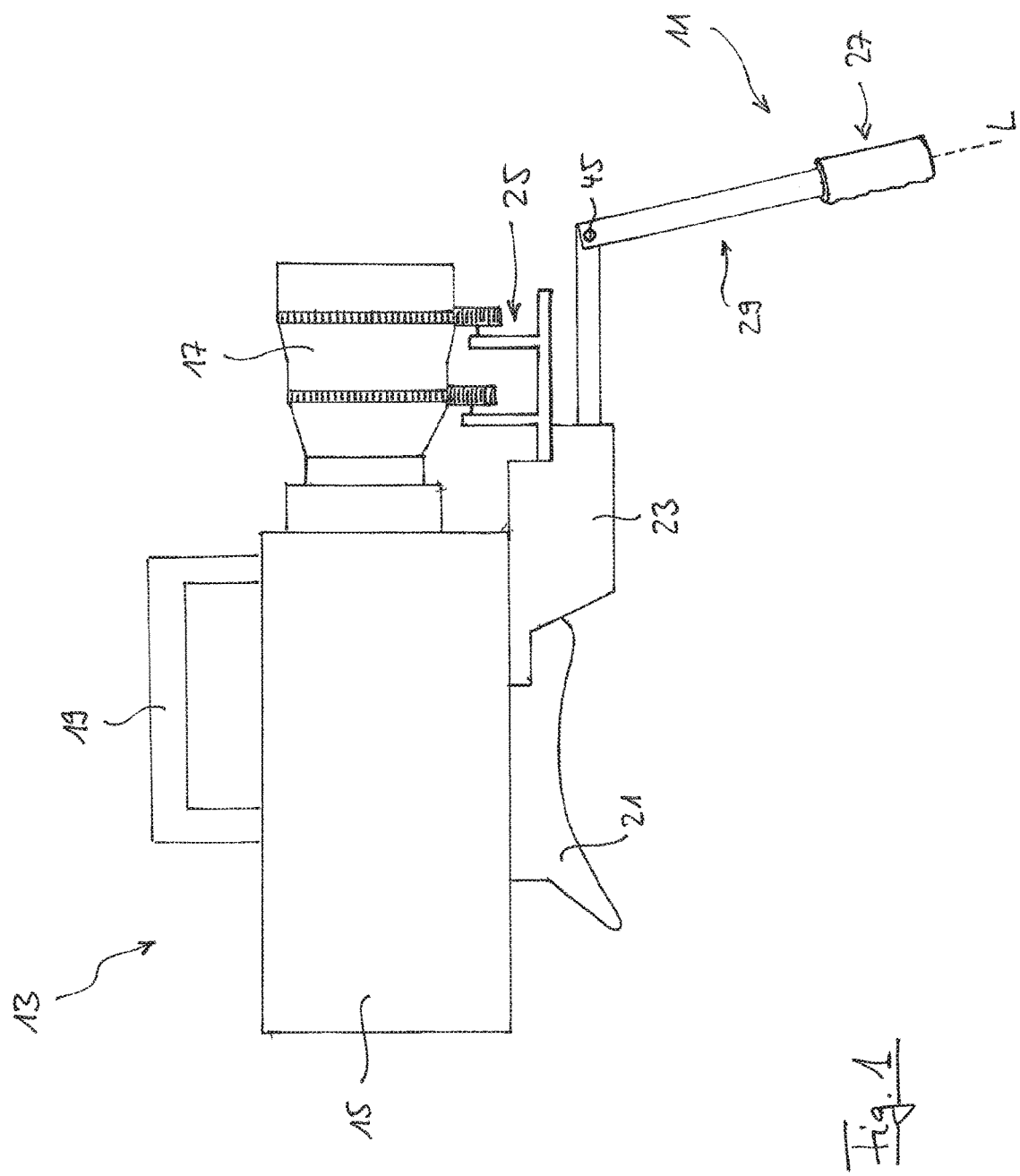

| | | | |
|---|---|---|---|
| 8,393,735 B2 | 3/2013 | Bar et al. | |
| 2007/0031143 A1* | 2/2007 | Riccardi | F16M 13/04 |
| | | | 396/420 |
| 2007/0172224 A1* | 7/2007 | Yukitake | G03B 17/20 |
| | | | 396/287 |
| 2008/0122796 A1* | 5/2008 | Jobs | G06F 3/0488 |
| | | | 345/173 |
| 2008/0239142 A1 | 10/2008 | Suzuki | |
| 2009/0003822 A1* | 1/2009 | Tyner | F16M 11/32 |
| | | | 396/428 |
| 2016/0188152 A1* | 6/2016 | Chou | G06F 3/0488 |
| | | | 345/173 |

FOREIGN PATENT DOCUMENTS

| | | |
|---|---|---|
| GB | 2345606 B | 2/2003 |
| WO | 2015003099 A1 | 1/2015 |

OTHER PUBLICATIONS

Photographs from internet retrieved prior to Mar. 4, 2016, Zacuto Control Grip, Son FS7 Smart Grip, Panasonic Varicam LT Handgrip, CineGrips.

Product brochure, Denz Digital Zoom Control DLC-01, retrieved prior to Apr. 4, 2016.

\* cited by examiner

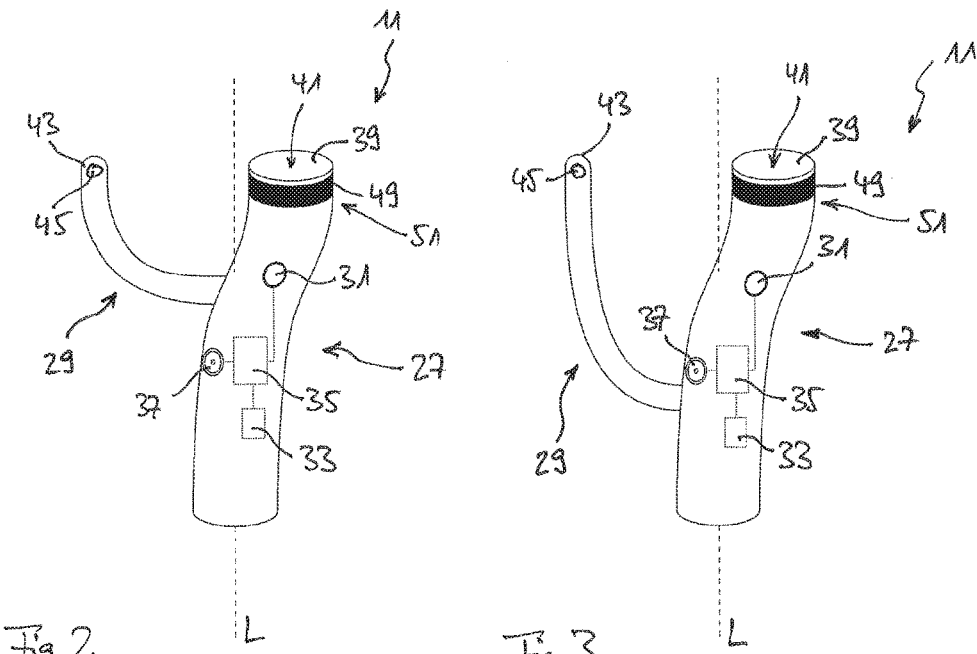
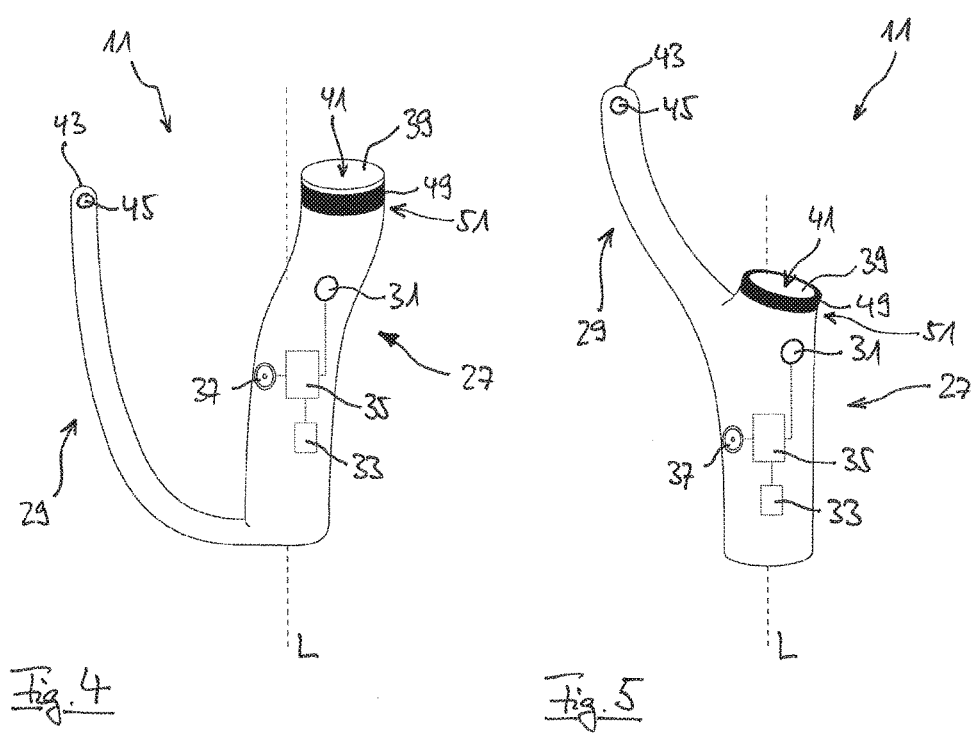

CAMERA GRIP

CROSS-REFERENCE TO RELATED APPLICATIONS

This application claims priority of German Patent Application DE 10 2016 106 997.3 filed Apr. 15, 2016.

FIELD OF INVENTION

The present invention relates to a hand grip for a motion picture camera, in particular for an electronic motion picture camera (video camera).

It is in particular known in the field of professional motion picture recording, for instance as part of the production of movies for TV and cinema, to use a hand grip that is separate from the respective motion picture camera used and that can be coupled mechanically and, optionally, also signal-wise as required, preferably in different positions, to the motion picture camera. A user of the motion picture camera, for instance the cameraman, is in this manner not restricted to holding the motion picture camera at its camera body, for instance at a carry handle or grip section provided directly at the camera body. The engagement point for a holding of the motion picture camera can rather be transposed to a position spaced apart from the camera body.

Provision can, for example, be made for a utilization of the motion picture camera in which the motion picture camera lies on a shoulder of the user to provide at least one hand grip beneath the support plane on the shoulder to be able to support the motion picture camera from below. Such a use is shown, for example, in FIGS. 1 and 2 of the U.S. Pat. No. 3,913,116.

With professional motion picture cameras, different objectives, so-called interchangeable objectives or interchangeable lenses, having different properties can selectively be connected. In particular when a heavy objective and/or some other camera accessory is/are arranged at a front side of a motion picture camera, a hand grip can be useful that is arranged rigid relative to the camera body and projects to the front in front of the camera body such that it can easily be gripped by the hand by the user shouldering the camera. In this respect, two hand grips can also be provided, that are in particular arranged symmetrically and that can simultaneously be gripped by a respective hand, for a more stable holding and guiding of the motion picture camera. Hand grips can also be attached to any other points as required.

The hand grip can also be fastened to a camera carrier, via which the hand grip is then indirectly mechanically coupled to the motion picture camera, alternatively to a fastening directly at the camera body or at an objective arranged hereat, for a fastening of the hand grip to the motion picture camera spaced apart from the camera body. The mechanical coupling is in this respect preferably rigid such that the motion picture camera can be reliably held or aligned via the hand grip. Such a camera carrier can anyway be provided for supporting the motion picture camera, for instance as part of a tripod system or rig system, and can have a suitable connection possibility for the hand grip. In this respect, the camera carrier can generally be configured for a variable connection of camera accessories and can, for example, comprise rods that can in particular be arranged at a lower side of the motion picture camera and can project beyond the camera body. A respective hand grip can then also be fastened thereto, optionally via a suitable adapter. Furthermore, hand grip extensions, for example in the form of (further) rods, can be provided between the hand grip and the motion picture camera for a further spacing of the hand grip from the motion picture camera and for a general expansion of the variability of the arrangement of the hand grip relative to the motion picture camera.

So that the user of the motion picture camera does not have to remove the hand from the hand grip for the adjustment of at least some parameters of the motion picture camera, in particular during a running motion picture recording, it is advantageous if such an adjustment can be carried out directly at the hand grip. For this purpose, the hand grip can have one or more actuation devices that can generally enable different actuations of the motion picture camera. It can thus be possible, for example, to start or to stop the recording of motion picture data at the hand grip and/or optionally to introduce different neutral filters into the optical path.

The actuation of the hand grip is, however, not limited to an adjustment of internal camera features, but provision can rather also be made that an accessory associated with the motion picture camera is adjusted. It is, for example, conceivable to control a focus drive associated with the motion picture camera via the hand grip fastened to the motion picture camera to adjust the aperture, the focus and/or the zoom of an objective connected to the motion picture camera. It is furthermore advantageous in this respect if, for instance, also a speed of the focus drive and/or adjustment limits can be fixed via the hand grip.

In addition to the mechanical coupling, the hand grip is in particular also coupled signal-wise, for example via corresponding cables and interfaces, for the transmission of an actuation made at the hand grip to the motion picture camera or to the focus drive. The signal-wise coupling in this respect does not have to extend spatially in parallel with the mechanical coupling. For example, the hand grip can be mechanically coupled to the motion picture camera via a camera carrier, whereas the hand grip can be directly coupled signal-wise to the motion picture camera and/or to a focus drive, for instance via one or more cable connections or via radio.

So that the hand grip can be used in as versatile a manner as possible without having to have a respective separate actuation device for every conceivable function, it is desirable if only a manageable number of actuation devices is provided and if the respective function of an actuation device can be configured as required.

Such a configuration, i.e. a change of the association between a control command that can be input by means of a respective actuation device and a respective control signal in response thereto to be output to the motion picture camera or to an associated focus drive, can take place, for instance, via the motion picture camera or via an external configuration system (e.g. configuration software executed at a personal computer) that typically have a corresponding user interface having input and output means. To the extent that the configuration of the hand grip is in this respect not carried out at the hand grip itself, such a configuration is, however, awkward and uncomfortable. It is in addition not possible to have information directly at the hand grip itself fast and simply on the current configuration. This can result in operating errors on the use of the hand grip.

It is an object of the invention to provide a hand grip for a motion picture camera that can in particular be used flexibly and that enables a comfortable configuration.

The object is satisfied by the features of claim 1.

The hand grip in accordance with the invention comprises a grip section and a connection section for connecting the grip section to the motion picture camera or to a camera carrier. The grip section and the connection section should in this respect in particular be distinguished functionally from one another to the extent that the grip section substantially serves and is preferably specifically adapted, for instance by its shape and alignment, to be gripped by a user of the motion picture camera, in particular by the hand, whereas the connection section substantially serves for the mechanical connection of the grip section to the motion picture camera or to the camera carrier and can in this respect in particular contribute to a spaced apart arrangement of the grip section from the motion picture camera.

The grip section in this respect does not necessarily have to be able to be gripped or gripped around by a user over its total extent. However, it in particular forms a uniform basic structure of the hand grip that is specifically adapted to a secure and pleasant gripping of the hand grip by hand, and preferably has ergonomically configured surfaces for this purpose. The connection section in contrast does not have to be ergonomically shaped, but is rather preferably configured such that it does not hinder an ergonomic gripping of the grip section. The connection section preferably extends away from the grip section for this purpose.

The hand grip additionally has at least one actuation device for inputting a control command. In this respect, the actuation device is preferably arranged at the grip section so that the actuation device can be actuated by a finger, for example, while the hand grip is held tight by one hand. All the actuation devices provided at the hand grip for inputting respective control commands are in particular arranged at the grip section of the hand grip.

A respective actuation device of the hand grip can in this respect in particular be configured in the manner of a push button, of a rotary knob, of a slider, of a one-dimensional or two-dimensional rocker, of a joystick, of a trackball or of a trackpad. An individual actuation device can in this respect be configured to be able to generate different control commands depending on the kind, e.g. the direction or strength, of an actuation.

The hand grip furthermore comprises an electronic memory for storing configuration data that represent an association between input control commands and different control signals; a control device for generating a control signal in response to the input control command and in dependence on the stored configuration data; and a signal output for outputting the generated control signal to the motion picture camera or to an associated focus drive.

Expressed in simple terms, a user of the camera can actuate (e.g. press) a respective actuation device of the hand grip, whereby a control command is generated that is initially non-specific with respect to the desired function, but is preferably specific with respect to the respective actuation of the actuation device. The control device can then associate a function-specific control signal with the control command thus input using the stored configuration data, said control signal being output to the motion picture camera or to the associated focus drive via the signal output and there being able to produce the implementation of the desired function. If the hand grip is coupled signal-wise both to the motion picture camera and to a focus drive, it is preferably also fixed by the configuration data whether a respective control signal is output to the motion picture camera or to the focus drive or is, optionally, output both to the motion picture camera and to the focus drive.

It is furthermore of advantage if the association between control signals and control commands represented by the configuration data is changeable. For by a change of the control signal that is generated in response to the control command input by means of a respective actuation device, a different function can be assigned to the respective actuation device. The hand grip thereby becomes individually configurable and usable in a particularly flexible manner. In addition, a change of the respective associated control signals can become necessary on a change of the motion picture camera or of the focus drive since then, where necessary, different control signals have to be generated and output for the same functions. The flexibility of use of the hand grip is also increased in this respect since the same hand grip can generally be used universally in this manner in connection with motion picture cameras of different manufacturers and designs.

In particular to enable a particularly comfortable configuration of the hand grip without having to use the motion picture camera or other devices external to the hand grip, the hand grip furthermore comprises an electronic display device for presenting a configuration menu that represents different configuration options, with the control device being adapted to change the stored configuration data in dependence on the presented configuration menu and in response to a configuration command of a user. To this extent, the hand grip therefore not only has input means, but rather also an output means in the form of the display device for interaction with the user. Due to the configuration menu shown, the user is thus not "blind" during the configuration and also does not need to know any specific actuation sequences for the configuration off by heart to be able to carry out the configuration directly at the hand grip. The configuration menu can rather provide the user with support and feedback during the configuration such that the user can be led through the configuration overall.

The configuration menu can in this respect be designed in different manners and can in particular comprise a plurality of different textual, graphic and/or mixed textual/graphic representations that are alternatively displayed on a display surface of the electronic display device. The electronic display device is preferably configured in the manner of a screen to display image information of generally any desired form, in particular at least two-colored, preferably multi-colored.

With such a hand grip, the function of a respective actuation device can thus be set fast and simply independently of the camera supported by the configuration menu. Provision is in this respect preferably additionally made that the respective current configuration status, can be displayed via the display device, optionally triggered by a corresponding query of the user, such that operating errors can be avoided.

A user can in particular choose between different available configuration commands as part of the menu navigation. A respective configuration command by which, for instance, the configuration is first started at all, by which a navigation through the configuration menu takes place, by which different configuration options are selected or fixed or by which the configuration is ended can thus advantageously be directly input at the hand grip by the user.

In accordance with an embodiment, the named actuation device is configured for inputting the configuration command. In other words, at least one actuation device can be provided by which not only a control command for an adjustment of the motion picture camera or of the focus drive can be input, but also a configuration command for configuring the hand grip. In this respect, whether a control command or a configuration command is input can in particular depend on the kind of actuation of the respective actuation device and/or on the status of the hand grip. For example, a further actuation device configured, for instance, as a switch or as a slider can be provided to switch between an operating status and a configuration status such that the named actuation device generates a control command or a configuration command in dependence on the respective status present.

However, different operating elements are preferably provided for an adjustment of the motion picture camera or of the focus drive, on the one hand, and for the configuration of the hand grip, on the other hand, since the likelihood of operating errors can be further reduced by such a functional separation of the operating elements. In accordance with an alternative embodiment, the hand grip therefore comprises at least one input device for inputting the configuration command. The input device is in this respect preferably configured separately from the at least one actuation device.

A combination of the above embodiments is generally furthermore also conceivable, according to which at least one actuation device is configured both for inputting a control command and for inputting a configuration command and in addition at least one input device separate therefrom is provided for inputting a (different) configuration command.

In accordance with an advantageous further development, the input device is integrated into the electronic display device. In such an embodiment, the hand grip can generally be configured in an otherwise conventional manner, but additionally has an electronic display device and, integrated therein, an input device for inputting configuration commands to enable a configuration of the hand grip directly at the hand grip itself—

The electronic display device is advantageously arranged at a position at the hand grip in which it can be easily read. Unlike this, a respective actuation device is advantageously arranged at a respective position at the hand grip at which it is easily reachable for the inputting of a control command for the user, in particular when he is actually holding the hand grip in the hand for supporting or guiding the motion picture camera, for instance. The electronic display device and the actuation device or actuation devices are therefore preferably arranged spatially separately from one another. This can in particular be achieved by an input device integrated in the electronic display device. For then the means (electronic display device) serving the configuration are clearly separated from those for controlling the motion picture camera (actuation device), which in return reduces the likelihood of operating errors.

The electronic display device is preferably configured as a touch-sensitive screen for a combined presentation of the configuration menu and inputting of the configuration command. The electronic display device is then simultaneously an input and output means and thus enables a particularly compact configuration of all the means required for the configuration of the hand grip, which is in particular especially important due to the available construction space at the hand grip that is very restricted as a rule.

Despite the small space requirement, a touch-sensitive screen provides a variety of possibilities for the design of the interaction between a user and the hand grip, in particular when not only individual selection actuations (for instance typing), but also a plurality of simultaneous actuations and/or gestures (such as swiping or more complex movement patterns) can be detected by the touch-sensitive screen. Comprehensive setting options can thus be implemented in a small space, for instance by a corresponding structure of the configuration menu. In addition, the configuration menu itself can be adapted for the operation of the configuration menu, for example by updating firmware, in order, for instance, to expand the functionality of the configuration menu or to change the menu navigation.

In accordance with an advantageous embodiment, the electronic display device is not configured in a typical rectangular shape. A larger area can admittedly be utilized or the addressing of the individual picture elements can admittedly be simpler with a rectangular display device than with a non-rectangular one with the same number of electronic components of the display device. However, the electronic display device can be more easily adapted to a structure, surrounding or adjacent to it, of the ergonomically shaped hand grip, into which it can thus be embedded more simply, by a non-rectangular design.

The electronic display device can in particular have an at least substantially round form in outline. In this respect, the electronic display device is preferably at least sectionally circular; however, it can also, for example, be sectionally oval or elliptical or can have an otherwise round shape.

In this respect, for example, a shape can also be considered as substantially round that deviates from a complete circle shape, oval shape or elliptical shape in that it only comprises corresponding circle or arc segments in part regions and in particular has one or more secants therebetween. Furthermore a polygon, in particular a rectangular polygon, can generally also be considered as substantially round whose corners lie on a circle, on an oval or on an ellipse, in particular when the polygon has at least five corners (e.g. a hexagon or an octagon). A polygonal, non-rectangular shape of the outline of the electronic display device can also enable an adaptation to a round or oval cross-sectional shape of the hand grip. At least one section of the substantially round shape of the electronic display device is, however, preferably arcuate.

The electronic display device is preferably provided at the grip section of the hand grip such that the connection section can advantageously substantially be restricted to the function of a mechanical spacer. In this case, the electronic display device is preferably adapted with respect to its shape to a cross-section of the grip section such that it can be fit particularly easily into the hand grip.

The described shapes of the electronic display device are in particular to be understood as with respect to the external shape of a display surface of the electronic display device on which the configuration menu can be presented. They can, however, also relate to a cross-sectional surface of the electronic display device, with them then in particular relating to a cross-sectional surface of the electronic display device in parallel with the named display surface.

In accordance with an embodiment, the electronic display device is arranged at an upper side of the grip section with respect to an at least substantially vertical alignment of the grip section. In this manner, the configuration menu can be read easily from above at the held hand grip without the electronic display device being covered by the hand of the user holding the grip section. An unintentional touching of the electronic display device and thus possibly the unintentional input of a configuration command or control command can furthermore hereby be particularly reliably avoided when the electronic display device is configured as a touch-sensitive screen.

The electronic display device can furthermore face upward in a position of use of the hand grip. The position of use is in this respect in particular defined by that orientation in which the hand grip is held for a stable and comfortable holding of the motion picture camera on a usual use of the hand grip. The hand grip is typically gripped by a hand in the position of use such that the thumb, on the one hand, and the other fingers of the respective hand, on the other hand, completely or at least partly grip around a substantially vertical axis.

That the electronic display device faces upward is in particular the case when a surface normal (of a display surface as described above) of the display device is vertically aligned or includes an acute angle, preferably an angle of at most 45°, with the vertical.

In accordance with a further embodiment, the electronic display device can form a free end of the grip section, i.e. the grip section in particular does not extend beyond this free end with the electronic display device. The extent of the grip section is rather terminated in this direction by the electronic display device.

In accordance with an embodiment, the grip section extends along a longitudinal axis, wherein the grip section is configured to be gripped or be gripped around the longitudinal axis by a hand of the user in the peripheral direction, and/or wherein the grip section is configured to be gripped or gripped around along its total longitudinal extent or only along a part of its longitudinal extent. The grip section can thus in particular have a substantially elongate structure that does not necessarily have to have an exactly straight extent, but can optionally have a swept extent, with a longitudinal axis being able to be identified at the extent of the elongate structure about which a hand of the user grips when holding the hand grip. The grip section can in particular be specifically adapted to such a holding, e.g. by an ergonomic surface shape. The grip section is configured for a secure holding of the hand grip, in particular for a gripping or gripping around by hand in the peripheral direction over at least 180°, preferably over approximately 270° or more.

In accordance with an advantageous further development, the longitudinal axis extends at least substantially in a vertical direction, in particular in the above-described position of use of the hand grip. This enables a secure gripping of the hand grip with a natural position of the hand.

The electronic display device can furthermore be arranged at an end face of the grip section with respect to the longitudinal axis. The electronic display device can thus form a termination of the grip section in the direction of the longitudinal axis. The electronic display device can thereby in particular be arranged such that it is advantageously not covered by the hand holding the grip section and is thus easily visible.

The electronic display device can furthermore extend in a direction or within a plane that is aligned at least substantially perpendicular to the longitudinal axis. The named display surface of the electronic display device is in this respect in particular aligned at least substantially perpendicular to the longitudinal axis. When a user hold the grip section of the hand grip around the longitudinal axis by one hand, he can thus easily read the display device. In addition, with an electronic display play configured as a touch-sensitive screen, an unintentional touching of the electronic display device and thus possibly the unintentional input of a command, can be avoided by an arrangement substantially perpendicular to the longitudinal axis. The electronic display device is preferably aligned such that at least its display surface is spaced apart from the surface of the grip section configured for a direct gripping or gripping around.

In accordance with a further embodiment, the connection section has an elongate shape and extends away from the grip surface to a free end. The shape of the connection section is in particular elongate to the extent that the extent of the connection section is larger along its extent from that point at which it is connected to the grip section up to its free end than transversely to this extent.

Fastening means for a fastening of the connection section to the motion picture camera or to the camera carrier are preferably provided at the free end of the connection section. Such fastening means can be configured in a manner known per se and can, for example, comprise a so-called ARRI (registered trademark) rosette. The fastening means in this respect preferably enable a rigid mechanical coupling of the hand grip to the motion picture camera or to the camera carrier. It is furthermore important for a reliable mechanical coupling of the grip section of the hand grip to the motion picture camera that the connection section is configured as correspondingly rigid and is connected to the grip section in a stable manner at its end opposite the free end.

In accordance with a preferred embodiment, the hand grip at least substantially has a Y shape having a first limb, a second limb and a third limb, wherein the grip section is provided at at least the first limb of the Y shape, wherein the connection section is provided at the second limb of the Y shape, and wherein the electronic display device is provided at the third limb of the Y shape. The limbs of the Y shape can in this respect have an extent deviating from an exactly straight extent. The second and third limbs can, for example, substantially be of U shape together, with the first limb then being able to extend, for example, from a lower vertex of the U shape or from a point offset with respect thereto.

The grip section can additionally not only be provided at the first limb of the Y shape, but also at the first and third limbs of the Y shape. The first and third limbs then preferably extend at least substantially along a common longitudinal extent. In this respect, however, a certain parallel offset (in particular in parallel with the longitudinal axis of the grip section) can be present, for instance by a swept transition, in the extent of the first and third limbs.

In accordance with an alternative embodiment, the hand grip at least substantially has a U shape having a first limb and a second limb, wherein the grip section and the electronic display device are provided at the first limb of the U shape and the connection section is provided at the second limb of the U shape. The U shape of the hand grip can be upwardly open in the position of use of the hand grip.

While the connection section therefore branches off from the hand grip in a middle region of the remaining hand grip with an embodiment having a Y shape, the connection section and the grip section are connected to one another at respective ends of their extents with the U shape. In both cases, the extents of the grip section and of the connection section are, however, essentially spatially spaced apart from one another such that they can be arranged and configured independently of one another in accordance with their respective functions: the grip section for a good reachability and grippability: the connection section for a stable fastening to the motion picture camera and for the bridging of a desired spacing from the motion picture camera.

In accordance with a further embodiment, the electronic display device is formed at an end of a projection of the hand grip, with the hand grip having an operating element at the projection. In this respect, the projection in particular faces away from the remaining hand grip. In this manner, the display device can project from the remaining hand grip, whereby the readability and accessibility of the display device can be improved.

In addition, the projection that is preferably at least substantially cylindrical, can provide additional space for the arrangement of an operating element that the hand grip has at the projection in accordance with a further embodiment. In this respect, the operating element can in particular be arranged between the electronic display device and the (remaining) grip section. The operating element is preferably arranged such that it is accessible for a finger, in particular for a thumb, of the hand with which the hand grip is just being held in the manner provided for this purpose.

The operating element can be configured as an actuation device for inputting a control command, in particular also for inputting a configuration command, or as an input device for inputting a configuration command. Alternatively or additionally, the operating element can also serve for other functions, for example for the selection of respective status information to be presented on the electronic display device or for the navigation through a displayed menu.

In accordance with a further development, the operating element surrounds the projection and/or the display device in a ring-like manner. This enables an advantageously compact arrangement of the electronic display device and of the operating element at the hand grip with a nevertheless good accessibility for an unimpeded observation of the electronic display device or for an actuation of the operating element by a user.

The operating element can in particular be configured as a rotary ring or as a rocker. Such a rotary ring can be restricted to a specific rotational angle range or can be rotatable without restriction and can generate control commands, configuration commands and/or other commands in dependence on an absolute rotational position or on a relative rotation. A rocker has at least one defined deflection position in which it can preferably be preloaded. A rotary rocker can in particular be provided that has at least one defined rotational position in which the rotary rocker is preferably preloaded. Depending on a deflection from such a basic position, control commands, configuration commands and/or other commands can be generated for a continuous adjustment, in particular at an adjustment speed depending on the degree of deflection.

In accordance with an embodiment, the control device is configured to control the electronic display device to selectively represent different status information of the hand grip, of the motion picture camera or of an objective connected to the motion picture camera. The electronic display device then serves, in addition to the presentation of the configuration menu for the support of a configuration of the hand grip, also for the information of the user on the status of the hand grip, of the motion picture camera and/or of the objective. To avoid operating errors of the hand grip, in particular information on the association of a respective actuation device of the hand grip with a function in accordance with the current configuration data can be displayed. Camera parameters can, for example, be displayed as status information on the motion picture camera and/or whether image data are currently being recorded or not is displayed. Objective parameters such as a set focal length, a focus range, in particular its limit spacings, or a set aperture of the objective can furthermore be displayed.

Depending on the kind and size of the electronic display devices, a plurality of status information can also be presented simultaneously in this respect. Or, for example, the configuration menu (or a part region or part menu thereof) as well as at least one piece of status information is presented simultaneously. The electronic display device is in this respect preferably configured for presenting a plurality of colors, in particular over the total visible spectrum, and freely selectable symbols and shapes. Different information can thus be clearly presented simultaneously, also over a small area, by suitable color encoding or symbol encoding or shape encoding.

In accordance with a preferred further development, the control device is configured to control the electronic display device to present graphical symbols and/or text content in a central region and in a single-colored area that surrounds the central region and whose color represents status information on the hand grip, on the motion picture camera or on the objective. The color of the area surrounding the central region can in this respect be different in dependence on the status information to be presented and preferably represents the recording state of the motion picture camera. Provision can in particular be made that it is displayed by a presentation of the area in a first (e.g. red) color that image data are currently being recorded, whereas the area is otherwise presented in a second (e.g. black or green) color.

The single-colored area surrounding the central region can, for example, form a margin, in particular of constant width, of a display area of the electronic display device. If the display device has a round shape, the single-colored surface can thus be substantially ring-shaped. In this respect, the single-colored area does not necessarily have to surround the central region over its full periphery. It preferably extends over a range of at least 180°, in particular of at least 270°.

The invention will be explained in more detail in the following only by way of example with reference to the drawings.

FIG. 1 shows in a schematic side view an exemplary arrangement of a hand grip at a motion picture camera; and FIGS. 2 to 5 show schematic representations of different embodiments of a hand grip in accordance with the invention in a perspective view.

A possible arrangement of a hand grip 11 at a motion picture camera 13 is shown in FIG. 1 to illustrate the use of an external hand grip 11 at a motion picture camera 13. The motion picture camera 13 comprises a camera body 15 to whose front side an objective 17 is connected. The motion picture camera 13 is preferably an electronic camera (also called an electronic film camera or video camera).

A carry grip 19 in the form of a hoop is provided at an upper side of the camera body 15 for the transport of the motion picture camera 13. The motion picture camera 13 can generally also be held at the carry grip 19 during a shot, i.e. during the recording of motion picture data. A shoulder pad 21 is, however, furthermore provided at a lower side of the camera body 15 for a more stable positioning of the motion picture camera 13, via which shoulder pad the motion picture camera 13 can be supported on a shoulder of the cameraman.

A support structure 23 is furthermore likewise arranged at a lower side of the camera body that can be configured as part of the motion picture camera 13 or as a separate camera carry that is connected to the motion picture camera 13 to connect the motion picture camera 13, for example optionally to a tripod (not shown). The support structure 23 can have different connection possibilities for accessories of the motion picture camera 13. A focus drive 25 is shown purely by way of example via which hand wheels of the objective 17 can be adjusted by a motor and which is arranged fixed to the motion picture camera 13 via the support structure 23.

In addition, a hand grip 11 is fastened to the support structure 23 that in particular serves to be gripped by a hand of the cameraman to hold the motion picture camera 13 in a stable position and/or to align it as required on a panning of the motion picture camera 13 while the motion picture camera 13 is supported on the shoulder of the cameraman. For this purpose, a grip section 27 of the hand grip projects beneath the camera body 15 until far in front of the camera body 15 such that it can be gripped by the cameraman in a relaxed posture. The hand grip 11 furthermore has, in addition to the grip section 27, a connection section 29, that connects the grip section 27 to the motion picture camera 13 via the support structure 23.

Two similar or like hand grips 11 can in particular be arranged, preferably substantially symmetrically with respect to one another (so that the one covers the other in FIG. 1) so that the motion picture camera 13 can simultaneously be held and guided by two hands in addition to the support on the shoulder.

The hand grip 11 shown in FIG. 1 is generally shown configured in the manner of conventional hand grips 11. The schematic representation of FIG. 1 should in this respect only illustrate an exemplary possibility of use of a hand grip 11 with a motion picture camera 13 as well as a typical alignment of the hand grip 11 in which a longitudinal axis L of the grip section 27 is aligned at least substantially perpendicular and in particular includes an acute angle, preferably an angle of at most 45°, with the vertical.

Embodiments of a hand grip 11 in accordance with the invention that show further details are shown schematically in FIGS. 2 to 5. These hand grips 11 each have an actuation device 31 that enables a control command for the motion picture camera 13 and/or for the objective 17 to be input directly at the hand grip 11. Only one respective actuation device 31 is shown schematically by way of example in the form of a push button. Such a push button can, for example, be configured for an adjustment of the objective into a zoom range by continuous pressing of the push button. The hand grips 11 can, however, have further and/or other types of actuation devices 31.

In addition, the hand grips 11 each comprise an electronic memory 33 in which configuration data are stored to associate a respective control signal with a control command of a respective actuation device 31 and each comprise a control device 35 that can read the configuration data from the electronic memory 33. The control device 35 is additionally connected to the actuation devices 31 to receive a control command triggered at a respective actuation device 31. The control device 35 can then generate a control signal that is currently associated with the respective control command using the read configuration data and that the control device 35 outputs via a signal output 37 to the motion picture camera 13 or to the focus drive 25.

For a signal-wise connection of the hand grip 11 and of the motion picture camera 13 or of the focus drive 25, one or more cables can in particular be provided that can be connected to a respective signal output 37 of the hand grip 11. While the mechanical coupling of a hand grip 11 with a motion picture camera 13 can at least be recognized in FIG. 1, the signal-wise coupling of the respective hand grip 11 to the motion picture camera 13 is not shown in the Figures.

The embodiments of FIGS. 2 to 5 in particular each have an electronic display device 39 that comprises a display surface 41 on which a configuration menu can be presented. To be able to input different navigation commands for navigating the configuration menu and different configuration commands for setting or changing the configuration data, the electronic display device 39 is configured as a touch-sensitive screen. The electronic display device 39 can in this manner detect touches of the display area 41 and/or pressure on the display area 41, in particular with spatial resolution, and thus simultaneously serves as input and output means for a menu-assisted interaction of a user with the hand grip 11. This enables a comfortable configuration of the hand grip 11 independently of the motion picture camera 13 or of other external means directly at the hand grip 11 itself.

The grip section 27 of the hand grips 11 shown in FIGS. 2 to 5 respectively has an elongate basic shape and extends along a longitudinal axis L. The grip section 27 is in this respect adapted for an ergonomic gripping in that those surfaces that are provided for a direct contact with a hand gripping the holding grip 11 are substantially configured complementary to a hand position typical in this respect. This enables a reliable holding of the hand grip 11 at a defined point.

Provision is in particular made in this respect that at least a part of the grip section 27 (with respect to its longitudinal extent) is gripped or gripped around. The longitudinal axis L is in this respect in particular substantially defined in that, when the hand grip 11 is held by a hand in the manner provided therefore, the fingers of the hand are substantially arranged at a circular path in the peripheral direction around the longitudinal axis L. In this respect, for a relaxed holding of the motion picture camera 13, the hand grip 11 is preferably aligned relative to the motion picture camera 13 such that the longitudinal axis L is aligned at least substantially vertically in a typical position of use such as in FIG. 1, that is in particular includes an acute angle, i.e. an angle of at most 90°, preferably an angle of at most 45°, with the vertical.

As can be recognized in the schematic representation of FIGS. 2 to 5, the electronic display device 39, in particular its display area 41, is respectively arranged at an upper side, namely in particular at an end face forming a free end of the grip section 27 with respect to the longitudinal axis L, of the grip section 27 of the respective hand grip 11 such that it faces at least substantially upward in the named position of use. As the embodiment in accordance with FIG. 5 illustrates by way of example, the electronic display device 39 can, however, also at least slightly deviate from an exactly perpendicular alignment of its display area 41 with respect to the longitudinal axis L, but preferably by less than approximately 45°, preferably less than approximately 30°, in particular less than 15°.

The electronic display device 39 furthermore has a respective circular cross-section in the embodiments of FIGS. 2 to 5, whereby the electronic display device 39 can be adapted particularly well to the corresponding cross-section of the grip section 27 of the hand grip 11. In this respect, the shape of the display area 41 usable for a presentation preferably at least substantially corresponds to the cross-section of the electronic display device 39. The shape of the usable display area 41 can, however, in particular also deviate therefrom for technical reasons such that, for example, a circle segment of the display area 41 having a center angle of preferably less than 90° cannot be used for presentation.

Unlike with the hand grip 11 of FIG. 1, in the embodiments in accordance with the invention in accordance with FIGS. 2 to 5, the connection section 29 formed as elongate does not extend in an extension of the longitudinal extent of the grip section 27, but rather preferably extends, starting from the grip section 27, (at least initially) transversely to the longitudinal axis L away from the grip section 27. The hand grip 11 can in particular at least substantially have a Y shape (as in FIGS. 2, 3 and 5) or a U shape (as in FIG. 4) by such a design, wherein the connection section 29 respectively forms a limb of the Y shape or of the Y shape, while the grip section 27 is respectively formed at at least one of the other limbs.

The connection section extends from the grip section 27 up to a free end 43 at which the connection section 29 has fastening means 45 for a mechanical coupling to the motion picture camera 13 or an element fixedly connected thereto such as the support structure 23. In this respect, in particular one or more hand grip extensions (for instance in the form of rods; not shown in the Figures) can additionally be provided to which the connection section 29 can be mechanically coupled by means of the fastening means 45 and via which the hand grip 11 can thus ultimately be rigidly connected to the motion picture camera 13.

A plurality of different kinds of fastening means 45 can be considered for a stable, in particular rigid, but preferably releasable, mechanical coupling. The fastening means 45 shown schematically in the Figures is a so-called ARRI (registered trademark) rosette that is especially suitable for a fastening of hand grips 11 to motion picture cameras 13 due to the possibility of establishing a reliable, rigid connection at different angles of rotation.

The hand grips 11 in accordance with FIGS. 2 to 5 furthermore each have an operating element 49 that is formed as a rotary ring as an additional actuation device 31 for inputting control commands or as an additional input device for inputting configuration commands. The operating element 49 is in this respect arranged directly adjacent to the electronic display device 39. In the embodiments in accordance with FIGS. 2 to 4, the operating element 49 is arranged in the direction of the longitudinal axis L behind the electronic display device 39. In the embodiment in accordance with FIG. 5, the operating element 49 coaxially surrounds the electronic display device 39.

In the embodiments shown in FIGS. 2 to 5, the electronic display device 39 respectively forms the termination of an extent of the hand grip 11 in a respective direction. The electronic display device 39 is to this extent respectively arranged at the end of a projection 51 formed at the hand grip 11. The operating element 49 provided behind the electronic display device 39 and/or around the electronic display device 39 then in particular extends around this projection 51. The projection 51 respectively has a cylindrical basic shape having an at least substantially circular cross-section to which the electronic display device 39 and the operating element 49 are advantageously adapted with respect to their respective shapes and/or their respective cross-sections for a seamless integration into the hand grip 11.

Alternatively to a configuration as a rotary ring, the operating element 49 can also be configured as a rotary rocker that is also simply called a rocker. The named projection 51 is in this respect preferably arranged at the hand grip 11 such that on a holding of the hand grip 11 in the manner provided therefore and in particular substantially predefined by the shape of the grip section 27, the operating element 49 can be comfortably actuated by one finger, in particular by the thumb, of the hand holding the hand grip 11.

REFERENCE NUMERAL LIST

11 hand grip
13 motion picture camera
15 camera body
17 objective
19 carry handle
21 shoulder pad
23 support structure
25 focus drive
27 grip section
29 connection section
31 actuation device
33 electronic memory
35 control device
37 signal output
39 electronic display device
41 display area
43 free end
45 fastening means
49 operating element
51 projection
L longitudinal axis

The invention claimed is:

1. A hand grip for a motion picture camera, comprising:
a grip section;
a connection section that connects the grip section to the motion picture camera or to a camera carrier;
at least one actuation device that inputs a control command;
an electronic memory that stores configuration data that represent an association between input control commands and different control signals;
a control device that generates a control signal in response to the input control command and in dependence on the stored configuration data;
a signal output that outputs the generated control signal to the motion picture camera or to an associated focus drive; and
an electronic display device controlled by the control device to present a configuration menu that represents different configuration options of different associations between The input control commands and The different control signals,
wherein the control device is configured to change the stored configuration data in dependence on the presented configuration menu and in response to a configuration command of a user.

2. The hand grip in accordance with claim 1, wherein the at least one actuation device is configured to input the configuration command.

3. The hand grip in accordance with claim 1, further comprising at least one input device that inputs the configuration command.

4. The hand grip in accordance with claim 3, wherein the at least one input device is integrated into the electronic display device.

5. The hand grip in accordance with claim 4, wherein the electronic display device is configured as a touch-sensitive screen for a combined presentation of the configuration menu and inputting of the configuration command.

6. The hand grip in accordance with claim 1, wherein the electronic display device is configured as non-rectangular.

7. The hand grip in accordance with claim 1, wherein the electronic display device is configured as at least substantially round.

8. The hand grip in accordance with claim 1, wherein the electronic display device is arranged at an upper side of the grip section with respect to an at least substantially vertical alignment of the grip section.

9. The hand grip in accordance with claim 1, wherein the electronic display device faces upward in a position of use of the hand grip.

10. The hand grip in accordance with claim 1, wherein the electronic display device forms a free end of the grip section.

11. The hand grip in accordance with claim 1, wherein the grip section extends along a longitudinal axis; and
wherein the grip section is adapted to be gripped by a hand of the user in a peripheral direction around the longitudinal axis and to be gripped along at least a part of its longitudinal extent.

12. The hand grip in accordance with claim 11, wherein the longitudinal axis extends at least substantially in a vertical direction in a position of use of the hand grip.

13. The hand grip in accordance with claim 11, wherein the electronic display device is arranged at an end face of the grip section with respect to the longitudinal axis.

14. The hand grip in accordance with claim 11, wherein the electronic display device extends in a direction that is aligned at least substantially perpendicular with respect to the longitudinal axis.

15. The hand grip in accordance with claim 1, wherein the connection section has an elongate shape and extends away from the grip section to a free end at which a fastener is provided that fastens the connection section to the motion picture camera or to the camera carrier.

16. The hand grip in accordance with claim 1, wherein the hand grip at least substantially has a Y shape having a first limb, a second limb and a third limb, wherein the grip section is provided at least the first limb of the Y shape; and wherein the connection section is provided at the second limb of the Y shape, and wherein the electronic display device is provided at the third limb of the Y shape.

17. The hand grip in accordance with claim 1, wherein the hand grip at least substantially has a U shape having a first limb and a second limb; and wherein the grip section and the electronic display device are provided at the first limb of the U shape and the connection section is provided at the second limb of the U shape.

18. The hand grip in accordance with claim 1, wherein the electronic display device is formed at an end of a projection of the hand grip, with the hand grip having an operating element at the projection.

19. The hand grip in accordance with claim 18, wherein the operating element is configured as a rotary ring or as a rocker.

20. The hand grip in accordance with claim 1, wherein the control device is configured to control the electronic display device selectively to present different pieces of status information of the hand grip, of the motion picture camera or of a connected objective.

21. A hand grip for a motion picture camera, comprising:
a grip section;
a connection section that connects the grip section to the motion picture camera or to a camera carrier;
at least one actuation device that inputs a control command;
an electronic memory that stores configuration data that represent an association between input control commands and different control signals;
a control device that generates a control signal in response to the input control command and in dependence on the stored configuration data;
a signal output outputs the generated control signal to the motion picture camera or to an associated focus drive; and
an electronic display device that presents a configuration menu that represents different configuration options,
wherein the control device is configured to change the stored configuration data in dependence on the presented configuration menu and in response to a configuration command of a user;
wherein the control device is configured to control the electronic display device to present graphical symbols and/or text content in a central region; and
wherein the control device is further configured to control the electronic display device to present a single-colored area surrounding the central region whose color represents status information of the hand grip, of the motion picture camera or of a connected objective.

* * * * *